United States Patent [19]

Ishikawa

[11] 4,398,765
[45] Aug. 16, 1983

[54] COVER PLATE FOR SPARE WHEEL HOUSING

[75] Inventor: Takeshi Ishikawa, Yokohama, Japan

[73] Assignee: Nissan Motor Co. Ltd., Yokohama, Japan

[21] Appl. No.: 288,912

[22] Filed: Jul. 31, 1981

[30] Foreign Application Priority Data

Aug. 11, 1980 [JP] Japan .......................... 55-113662[U]

[51] Int. Cl.³ .............................................. B60P 3/22
[52] U.S. Cl. ................................ 296/37.2; 296/37.14; 296/37.16; 24/297
[58] Field of Search ................. 296/37.2, 37.16, 37.1, 296/37.14; 24/297, 292; 160/237

[56] References Cited

U.S. PATENT DOCUMENTS 2,983,008  5/1961  Von Rath ............................. 24/297
3,093,874  6/1963  Rapata ................................ 24/297

Primary Examiner—Robert R. Song

[57] ABSTRACT

A cover plate for covering an upper opening of a spare wheel housing for accommodating a spare wheel of a vehicle. The cover plate is so formed as to completely cover the upper opening of the spare wheel housing and is provided at a center of a lower surface of the cover plate with anchoring means adapted to resiliently engage a hub hole of a wheel disc of a spare wheel, thereby preventing the cover plate from being shifted by vibrations or other forces of the vehicle.

1 Claim, 6 Drawing Figures

FIG. 1
*PRIOR ART*
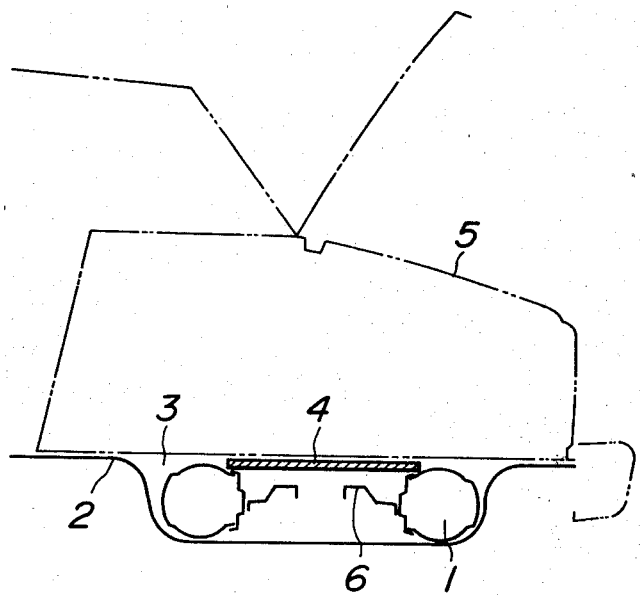
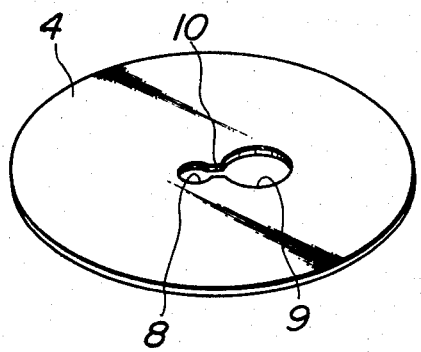
FIG. 2
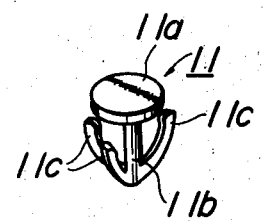
FIG. 3
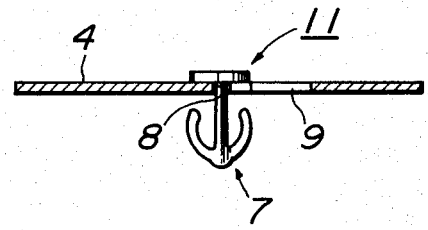
FIG. 4

COVER PLATE FOR SPARE WHEEL HOUSING

BACKGROUND OF THE INVENTION

1. Field of the Invention

This invention relates to a cover plate for covering an upper opening of a spare wheel housing for accommodating a spare wheel of a vehicle.

2. Description of the Prior Art

A conventional cover plate for a spare wheel housing is shown for example in FIG. 1, in which a floor panel 2 is depressed correspondingly to a shape of a spare wheel 1 to form a spare wheel housing 3. Within the spare wheel housing 3 is horizontally arranged the spare wheel 1, on the upper side of which is located the cover plate 4. A floor panel 2 which is a bottom of a trunk 5 of a vehicle is inherently preferably flat without any protrusion or depression and therefore the spare wheel housing 3 formed in the floor panel is preferably closed over its entire upper opening.

Such a conventional cover plate 4 is a mere thin disc plate. When the cover plate 4 is made larger than the aforementioned upper opening of the spare wheel housing 3, the cover plate 4 is only positioned on the floor panel 2 without any means for anchoring the plate in place. Accordingly, the cover plate is often likely to be shifted by vibrations or other forces of the vehicle. To avoid this, a conventional cover plate 4 is often made smaller than an outer diameter of the spare wheel 1 so that an outer circumference of the cover plate abuts against a circular raised surface of a sidewall of the tire to determine the position of the cover plate 4.

With such a conventional cover plate for a spare wheel, however, the cover plate 4 is smaller than the outer diameter of the spare wheel 1 to be supported on the upper side of the spare wheel, so that the outer circumference of the cover plate is apt to injure the spare wheel, while the cover plate 4 covers only a wheel disc 6 but does not cover a circular space between the outer circumference of the spare wheel 1 and the upper edge of the spare wheel housing 3, with the result that the cover plate does not sufficiently keep flat the bottom of the trunk 5. Moreover, as the cover plate does not have means for anchoring itself, the plate is likely to be shifted by vibrations or other forces of the vehicle and therefore it is difficult to maintain the cover plate in place.

SUMMARY OF THE INVENTION

It is an object of the invention to provide an improved cover plate for a spare wheel housing, which eliminates the above disadvantages of the prior art.

It is a primary object of the invention to provide a cover plate for a spare wheel housing, which is so formed as to cover an upper opening of a spare wheel housing and is provided at a center of a lower surface of the cover plate with anchoring means adapted to resiliently engage a hub hole of a wheel disc of a spare wheel.

The invention will be more fully understood by referring to the following detailed specification and claims taken in connection with the appended drawings.

BRIEF DESCRIPTION OF THE DRAWINGS

FIG. 1 is a sectional view of a cover plate for a spare wheel housing of the prior art as mentioned above;

FIG. 2 is a perspective view of a cover plate according to the invention;

FIG. 3 is a perspective view of anchoring means for use in the cover plate shown in FIG. 2 according to the invention;

FIG. 4 is a sectional view of the cover plate shown in FIG. 2 with the anchoring means shown in FIG. 3;

DETAILED DESCRIPTION OF THE PREFERRED EMBODIMENT

Figure 5:
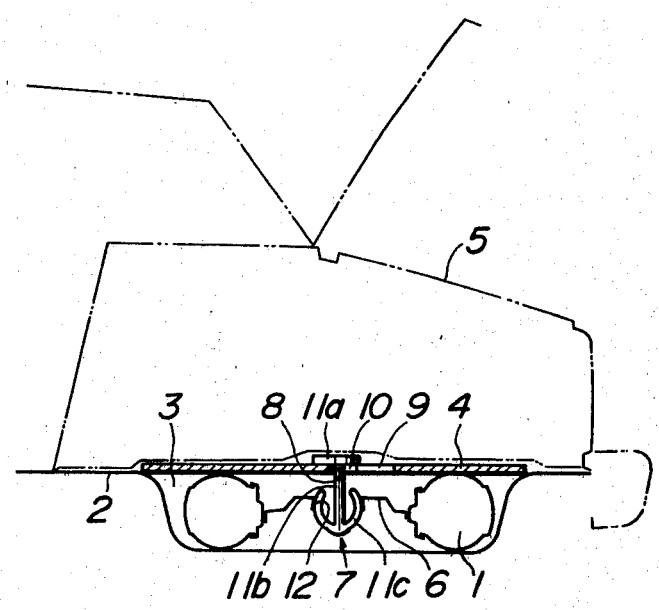
FIG. 5 illustrates a used condition of the cover plate having anchoring means shown in FIG. 4.

FIGS. 2-4 illustrate one embodiment of the invention. Referring first to FIG. 2, a cover plate 4 is made of a thin plate material in the form of a disc. The cover plate 4 is formed at its center with a center hole 8 for holding an anchoring means 7 mentioned later and is further formed at a location radially spaced a suitable distance from the center hole 8 with a hole 9 for engaging fingers of a hand for lifting the cover plate 4. The center hole 8 and the hole 9 are communicated with each other by an elongated slot 10.

Referring to FIG. 3, a reference numeral 11 shows a clip which constitutes the above mentioned anchoring means 7 for the cover plate 4 when it is secured to the cover plate 4. The clip 11 consists of a head 11a, a shaft 11b and fingers 11c. The disc-like head 11a is provided at the center on its lower side with the shaft 11b downwardly extending therefrom. At the lower end of the shaft 11b on the opposite side of the head 11a are provided the three fingers 11c formed integrally with the shaft 11b and having upper ends facing to the head 11a. The clip 11 is made of a resilient material such as a plastic material or snythetic resin as a whole to give an elasticity to the fingers 11c. The shaft 11b is thinner than the center hole 8 of the cover plate 4. The outer surfaces of the three fingers form an imaginary circle whose outer diameter is reasonably larger than a diameter of a hub hole 12 of a wheel disc 6 of the spare wheel 1.

The clip 11 formed as above described is secured to the cover plate 4 to form anchoring means 7 consisting of the clip 11 on the cover plate 4. In this case, the shaft 11b and the fingers 11c of the clip 11 are inserted through the hole 9 of the cover plate 4, and while keeping the relation between the cover plate 4 and clip 11, the shaft 11c is then moved in parallel with the surface of the cover plate through the elongated slot 10 into the center hole 8, so that the anchoring means 7 is formed at the center of the lower surface of the cover plate 4.

The operation of the cover plate 4 with the anchoring means 7 will be explained hereinafter. When it is required to arrange the cover plate 4 on the spare wheel housing 3, the anchoring means 7 of the cover plate 4 is fitted into the hub hole 12 of the wheel disc 6 of the spare wheel 1 accommodated in the spare wheel housing 3. Although the diameter of the imaginary circle formed by the outer surfaces of the three fingers 11c is larger than the inner diameter of the hub hole 12 of the wheel disc of the spare wheel, the outer surfaces of the fingers 11c abut against the inner periphery of the hub hole 12 and the fingers 11c are guided by the inner periphery and slid into the hub hole 12 while being elastically deformed. As the result, the fingers 11c are fitted within the hub hole 12 smaller than the imaginary circle formed by the outer surfaces of the fingers. In addition, the fingers 11c tend to urge the hub hole 12 of the wheel disc outwardly, so that the cover plate 4 is resiliently fixed to the spare wheel 1 without removal of the anchoring means 7 from the hub hole 12 of the wheel disc. The upper opening of the spare wheel housing 3 is completely covered by the cover plate 4. Moreover, as the cover plate 4 and the spare wheel 1 are elastically connected to each other, the position of the cover plate 4 secured to the spare wheel 1 is not shifted unintentionally.

When it is required to remove the cover plate 4 from the spare wheel 1, fingers of one hand of a driver engage the edge of the hole 9 of the cover plate 4 to lift it against the engaging force between the anchoring means 7 and hub hole 12 of the wheel disc so as to disengage therebetween. In this case, when the cover plate is lifted upwardly, the outer surfaces of the fingers 11c abut against the inner periphery of the hub hole 12 of the wheel disc and are guided thereby while being elastically deformed, so that distances between the fingers 11c are reduced and therefore the imaginary circle formed by the outer surfaces of the fingers becomes smaller than the diameter of the hub hole 12, permitting the anchoring means 7 to remove from the hub hole 12.

Figure 6:
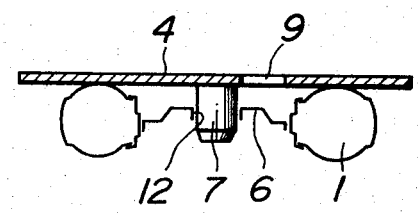
FIG. 6 is a sectional view of a cover plate with anchoring means of another embodiment of the invention.

FIG. 6 illustrates another embodiment of the invention, wherein anchoring means 7 in the form of a column is provided at the center on the lower surface of the cover plate 4. An outer diameter of a cross-section of the column-like anchoring means 7 is made substantially equal to that of the hub hole 12. According to this embodiment, when the column-like anchoring means 7 is fitted in the hub hole 12 of the wheel disc of the spare wheel, the cover plate 4 is held in place against a horizontal movement and simultaneously vertically positioned with the aid of weight of gravity of the cover plate 4 and anchoring means 7.

The anchoring means 7 may be made of an elastic material as well as a rigid material. Moreover, the anchoring means 7 may be formed integrally with the cover plate 4 by injection molding or it may be integrally fixed to the cover plate 4 by welding or other means. In these cases, the head 11a is not essential for the anchoring means 7. Furthermore, various shapes and constructions of the anchoring means 7 may be employed other than those of the above two embodiments, so long as the anchoring means extends downwardly from the center of the lower surface of the cover plate.

As can be seen from the above explanation, a cover plate according to the invention is so formed as to cover an upper opening of a spare wheel housing and is provided at a center of a lower surface of the plate with anchoring means adapted to resiliently engage a hub hole of a wheel disc of a spare wheel. With such an arrangement, the overall upper opening of the spare wheel housing is covered by the cover plate, so that the cover plate does no longer injure sidewalls of the spare wheel and completely close a depression of the spare wheel housing to keep flat a floor of a trunk of a vehicle or the like. The cover plate is firmly kept in place, so that it is not shifted by vibrations or other forces of the vehicle. As the anchoring means is adapted to engage a hub hole of a wheel disc of a spare wheel, the cover plate and anchoring means can be applied to tires of various sizes without changing the cover plate and anchoring means.

While the invention has been particularly shown and described with reference to preferred embodiments thereof, it will be understood by those skilled in the art that the foregoing and other changes in form and details can be made therein without departing from the spirit and scope of the invention.

1. A structure for retaining a spare wheel housing, comprising a cover plate having anchoring means engaging a hub hole of a wheel disc of a spare wheel housed in said spare wheel housing, said anchoring means comprising a disc-like head, a shaft depending from a lower surface of the head and a plurality of fingers at a lower end of said shaft and extending upwardly to form an imaginary circle larger than the hub hole of said spare wheel, said cover plate being provided at its center with a hole smaller than said disc-like head for holding said anchoring means and being further provided at a location radially spaced a predetermined distance from said center hole with a hole communicating with said center hole through an elongated slot formed in said cover plate for engaging the fingers of said head for lifting the cover plate.

* * * * *